(12) United States Patent
Wittmaak

(10) Patent No.: US 10,220,942 B2
(45) Date of Patent: Mar. 5, 2019

(54) BRAKING SYSTEMS FOR ROTORCRAFT

(71) Applicant: Bell Helicopter Textron Inc., Fort Worth, TX (US)

(72) Inventor: John Robert Wittmaak, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 288 days.

(21) Appl. No.: 15/241,529

(22) Filed: Aug. 19, 2016

(65) Prior Publication Data
US 2018/0050796 A1 Feb. 22, 2018

(51) Int. Cl.
*B64C 27/12* (2006.01)
*B64D 41/00* (2006.01)
*B60L 7/02* (2006.01)
*B60L 7/10* (2006.01)

(52) U.S. Cl.
CPC ........... *B64C 27/12* (2013.01); *B60L 7/02* (2013.01); *B60L 7/10* (2013.01); *B64D 41/00* (2013.01); *B60L 2200/10* (2013.01); *Y02T 90/16* (2013.01)

(58) Field of Classification Search
CPC . B64D 31/14; B64D 35/00; F16B 2/00; F16B 35/00
USPC ...................................................... 188/264 P
See application file for complete search history.

(56) References Cited

U.S. PATENT DOCUMENTS

| | | | | |
|---|---|---|---|---|
| 4,632,337 A * | 12/1986 | Moore | ............... | B64C 27/12 244/17.19 |
| 9,004,614 B1 * | 4/2015 | Elving | ............... | B64C 27/12 303/71 |
| 2008/0277213 A1 * | 11/2008 | Doleschel | ............... | B64C 27/12 188/72.6 |
| 2013/0102431 A1 * | 4/2013 | Doleschel | ............... | F16H 3/54 475/151 |
| 2014/0087916 A1 * | 3/2014 | Johnson | ............... | B60K 6/12 477/2 |
| 2014/0283519 A1 * | 9/2014 | Mariotto | ............... | F02C 7/36 60/698 |
| 2014/0373521 A1 * | 12/2014 | DeVita | ............... | B64D 35/00 60/336 |
| 2015/0143950 A1 * | 5/2015 | Bedrine | ............... | B64C 27/04 74/661 |
| 2015/0259064 A1 * | 9/2015 | Elving | ............... | B64C 27/12 60/591 |
| 2015/0274287 A1 * | 10/2015 | Robertson | ............... | B64C 27/12 475/269 |

(Continued)

OTHER PUBLICATIONS

Lightning Hybrids: https://www.youtube.com/watch?v=Wcjb1B7xmrA "Lightning Hybrids Short Technical Video" Jun. 1, 2016.*

*Primary Examiner* — Timothy D Collins
*Assistant Examiner* — Tye William Abell
(74) *Attorney, Agent, or Firm* — Lawrence Youst PLLC

(57) ABSTRACT

In some embodiments, a rotorcraft includes a fuselage having a rotor hub assembly protruding therefrom that is rotatable relative thereto. A generator having an armature is mechanically coupled to the rotor hub assembly such that the armature is rotatable in response to rotation of the rotor hub assembly. A braking unit is in selective electrical communication with the generator. The braking unit is adapted to apply an electrical resistance to rotation of the armature, thereby reducing a rotational speed of the rotor hub assembly.

19 Claims, 5 Drawing Sheets

(56) References Cited

U.S. PATENT DOCUMENTS

2016/0052628 A1* 2/2016 Griffith .................. B64C 27/04
                                                        244/76 R
2017/0152034 A1* 6/2017 Graber .................. B64C 27/024

* cited by examiner

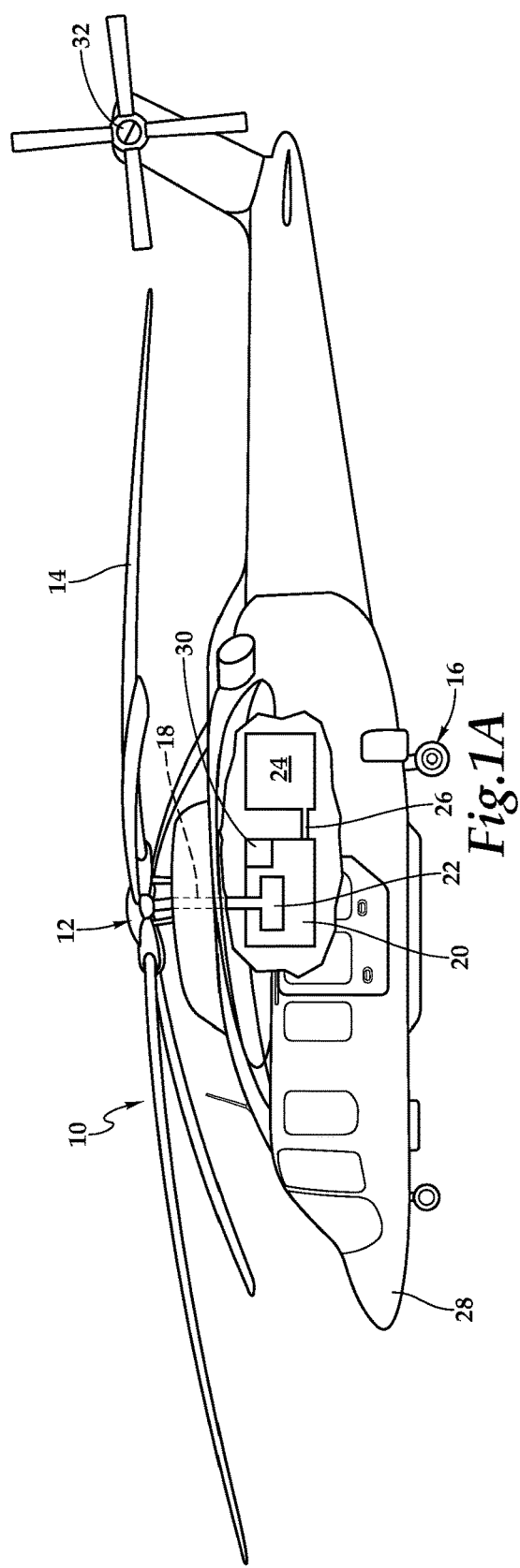
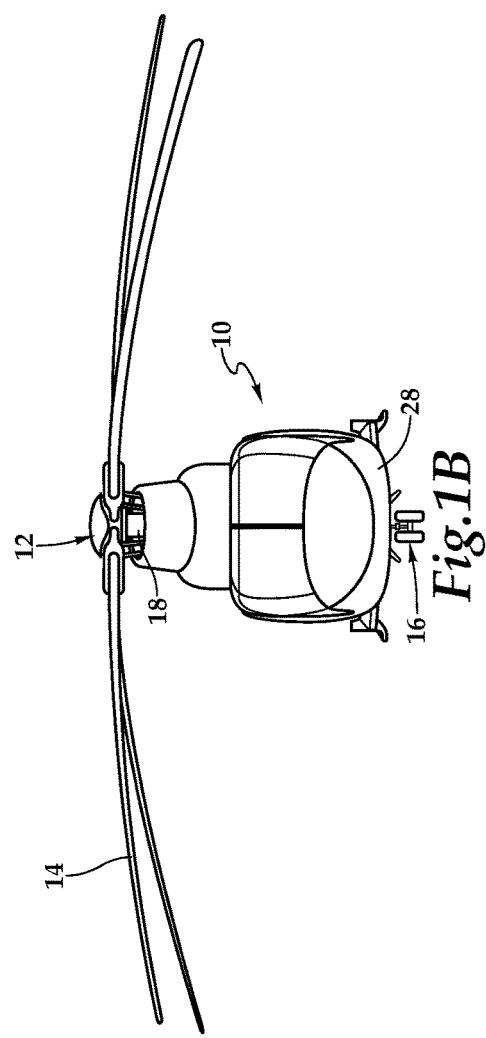

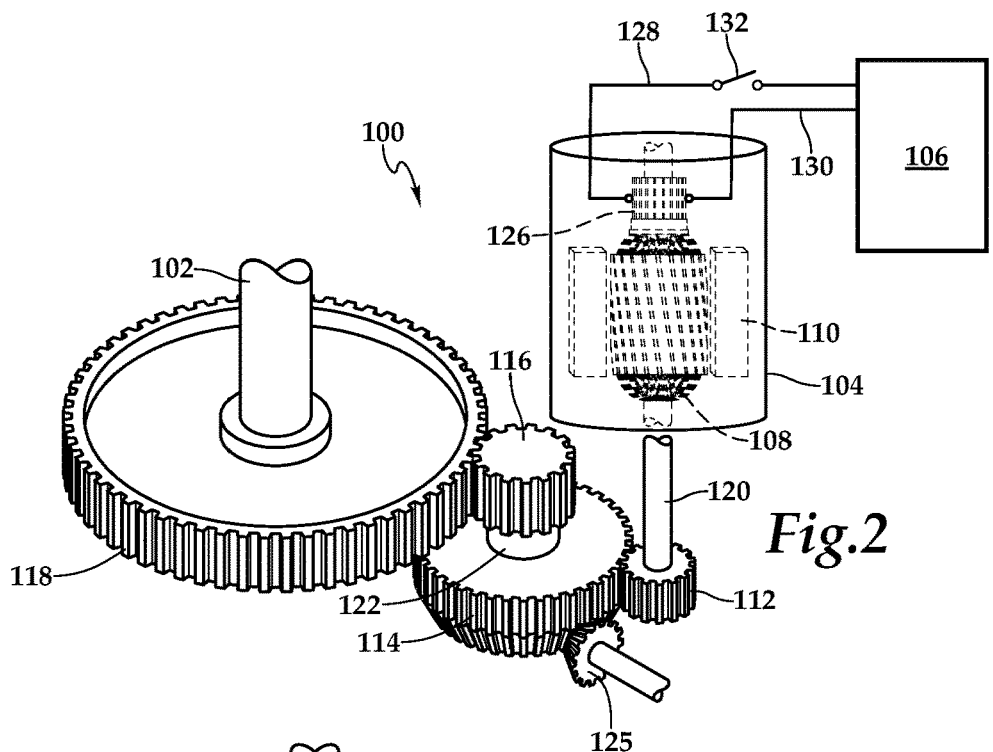
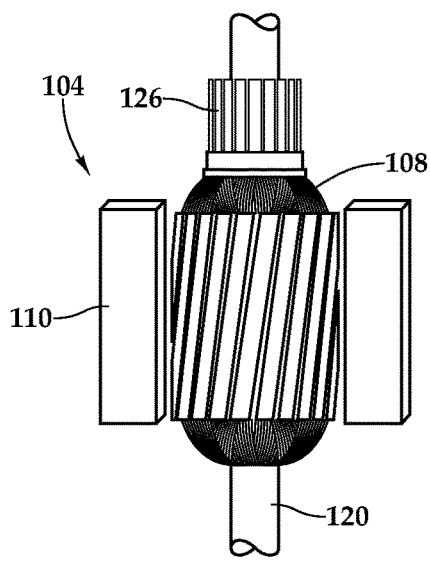
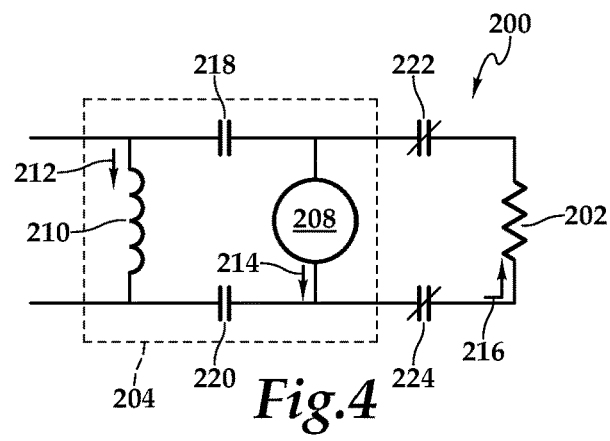

BRAKING SYSTEMS FOR ROTORCRAFT

TECHNICAL FIELD OF THE DISCLOSURE

The present disclosure relates, in general, to braking systems for use on rotorcraft and, in particular, to braking systems utilizing electrical and/or hydraulic resistance to absorb the kinetic energy of a rotor hub assembly of a rotorcraft, thereby slowing or stopping the rotation of the rotor hub assembly.

BACKGROUND

A rotorcraft, such as a helicopter, includes a rotating rotor hub assembly that includes two or more rotor blades to generate lift and propulsion. While rotating, the rotor hub assembly has kinetic energy, which must be reduced during braking operations, such as when the rotorcraft lands. Rotorcraft brakes should also dissipate energy at a rate deemed acceptable by the pilot, but slow enough to prevent rotorcraft damage. Rotorcraft may have entire rotor brake subsystems devoted to reducing the rotational speed of the rotor hub assembly. For example, rotorcraft currently utilize disc-and-caliper braking systems, in which fluid pressure from a master cylinder drives caliper pistons onto brake pads, which clamp on a rotating disc, thereby producing friction that slows the rotor hub assembly. These existing systems are not unlike the disc brakes used on some automobiles.

Traditional braking systems, such as disc-and-caliper systems, however, have several drawbacks. First, disc-and-caliper systems add significant weight to the rotorcraft, increasing the amount of lift needed to fly the rotorcraft, thereby consuming more fuel and reducing rotorcraft endurance. Second, disc-and-caliper systems take up valuable space in the rotorcraft. Third, because they constitute an entirely separate subsystem, disc-and-caliper systems add complexity to the braking functionality of the rotorcraft. For example, disc-and-caliper systems may require sensors that ensure the caliper has released pressure after braking to prevent the heat generated between the brake pads and disc from causing a fire. Fourth, disc-and-caliper systems can be expensive, adding to the overall cost of the rotorcraft. Accordingly, a need has arisen for improved rotorcraft braking systems that reduce rotorcraft weight and are able to utilize existing components of the rotorcraft to achieve the braking functionality. A need has also arisen for improved rotorcraft braking systems that are smaller, safer, less expensive and do not contribute to the complexity of the rotorcraft in a detrimental way.

SUMMARY

In a first aspect, a braking system for a rotorcraft having a rotor hub assembly includes a generator having an armature mechanically coupled to the rotor hub assembly such that the armature is rotatable in response to rotation of the rotor hub assembly and a braking unit in selective electrical communication with the generator. The braking unit is adapted to apply an electrical resistance to rotation of the armature, thereby reducing a rotational speed of the rotor hub assembly.

In some embodiments, the braking unit may include a resistor such as a variable resistor. In certain embodiments, the braking unit may include a rechargeable battery or other electrical component. In some embodiments, the generator includes at least one magnet at least partially surrounding the armature, wherein the magnet is non-rotating relative to the armature.

In a second aspect, a rotorcraft includes a fuselage and a rotor hub assembly protruding from the fuselage, the rotor hub assembly rotatable relative to the fuselage. A generator having an armature is mechanically coupled to the rotor hub assembly such that the armature is rotatable in response to rotation of the rotor hub assembly. A braking unit is in selective electrical communication with the generator. The braking unit is adapted to apply an electrical resistance to rotation of the armature, thereby reducing a rotational speed of the rotor hub assembly.

In some embodiments, the rotorcraft may include a gearbox containing a plurality of gears, wherein the armature is mechanically coupled to the rotor hub assembly via at least one of the gears. In certain embodiments, the rotorcraft may include an engine operable to selectively provide rotational input to the rotor hub assembly, wherein the rotor hub assembly is operable to freely rotate in response to mechanical disengagement between the engine and the rotor hub assembly. In some embodiments, the braking unit may apply the electrical resistance in response to a braking signal input from a pilot of the rotorcraft.

In a third aspect, a braking system for a rotorcraft having a rotor hub assembly includes a hydraulic pump having an input shaft mechanically coupled to the rotor hub assembly such that the input shaft is rotatable in response to rotation of the rotor hub assembly and a braking unit in fluid communication with the hydraulic pump. The braking unit is adapted to selectively provide a hydraulic resistance to rotation of the input shaft, thereby reducing a rotational speed of the rotor hub assembly.

In some embodiments, the braking unit may include an orifice operable to adjust the hydraulic resistance applied to the input shaft of the hydraulic pump. In such embodiments, the braking system may include a fluid reservoir in fluid communication with the orifice. The orifice may include a solenoid valve. In certain embodiments, the braking unit may include a hydraulic-powered component. In some embodiments, the braking unit may include a hydraulic accumulator that is adapted to store a pressurized fluid usable to power a hydraulic-powered component of the rotorcraft.

In a fourth aspect, a rotorcraft includes a fuselage and a rotor hub assembly protruding from the fuselage, the rotor hub assembly rotatable relative to the fuselage. A hydraulic pump has an input shaft mechanically coupled to the rotor hub assembly such that the input shaft is rotatable in response to rotation of the rotor hub assembly. A braking unit is in fluid communication with the hydraulic pump. The braking unit is adapted to selectively provide a hydraulic resistance to rotation of the input shaft, thereby reducing a rotational speed of the rotor hub assembly.

In some embodiments, the rotorcraft may include a gearbox containing a plurality of gears, wherein the hydraulic pump is mechanically coupled to the rotor hub assembly via at least one of the plurality of gears. In certain embodiments, the rotorcraft may include an engine operable to selectively provide rotational input to the rotor hub assembly, wherein the rotor hub assembly is operable to freely rotate in response to mechanical disengagement between the engine and the rotor hub assembly. In some embodiments, the braking unit applies the hydraulic resistance in response to a braking signal input from a pilot of the rotorcraft.

BRIEF DESCRIPTION OF THE DRAWINGS

For a more complete understanding of the features and advantages of the present disclosure, reference is now made to the detailed description along with the accompanying schematic figures in which corresponding numerals in the different figures refer to corresponding parts and in which:

FIGS. 1A-1B are schematic illustrations of an exemplary rotorcraft utilizing a braking system in accordance with embodiments of the present disclosure;

FIG. 2 is an isometric view of an electrical braking system for use on a rotorcraft in accordance with embodiments of the present disclosure;

FIG. 3 is a side view of a generator for an electrical braking system for use on a rotorcraft in accordance with embodiments of the present disclosure;

FIG. 4 is a circuit diagram of an electrical braking system for use on a rotorcraft in accordance with embodiments of the present disclosure;

DETAILED DESCRIPTION

Figure 5A:
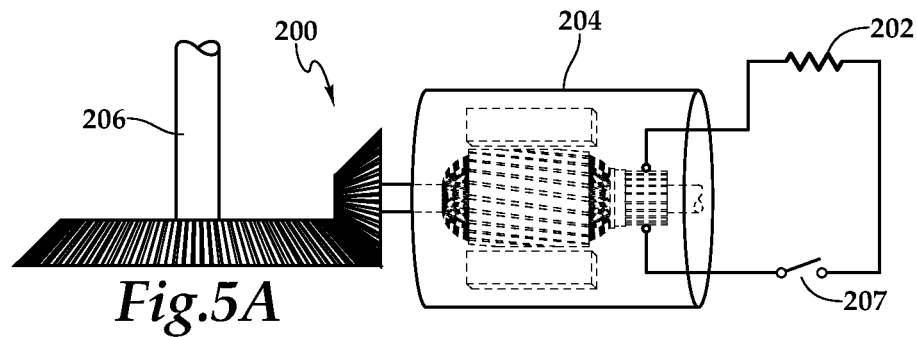
FIGS. 5A-5C are various schematic side views of electrical braking systems having different braking units for use on a rotorcraft in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. Unless otherwise indicated, as used herein, "or" does not require mutual exclusivity.

Referring to FIGS. 1A and 1B in the drawings, a rotorcraft is schematically illustrated and generally designated 10. Rotorcraft 10 has a rotor hub assembly 12, which includes a plurality of rotor blades 14. The pitch of rotor blades 14 can be collectively and cyclically manipulated to selectively control direction, thrust and lift of rotorcraft 10. Rotorcraft 10 has a landing gear system 16 to provide ground support for rotorcraft 10. Rotor hub assembly 12 is supported atop rotorcraft 10 by a mast 18, which connects rotor hub assembly 12 to a gearbox 20. The bottom end of mast 18 includes a main rotor gear 22 that is located in gearbox 20. Gearbox 20 includes a plurality of gears that are mechanically coupled to an engine 24. As used herein, the term "coupled" may include direct or indirect coupling by any means, including moving and nonmoving mechanical connections. Engine 24 provides mechanical and rotational energy to gearbox 20 via a driveshaft 26. Rotor hub assembly 12 is rotatable in response to rotation output from engine 24. Gearbox 20 also includes a transmission that is used to adjust the engine output from driveshaft 26 to a suitable rotational speed of main rotor gear 22 so that rotor hub assembly 12 rotates at a desired speed.

Rotor hub assembly 12 is rotatable relative to a fuselage 28 of rotorcraft 10. In various operational circumstances, it may be necessary to slow or stop rotor hub assembly 12 from rotating. After engine 24 ceases to provide rotational input to rotor hub assembly 12, rotor hub assembly 12, due to inertia, continues to have kinetic energy in the form of continued rotation. Rotorcraft 10 includes a braking system 30 that is operable to reduce, or halt, the rotational speed of rotor hub assembly 12. Braking system 30 may electrically or hydraulically resist the continued rotation of rotor hub assembly 12 in response to a braking signal input from a pilot of rotorcraft 10 or elsewhere. Depending on the embodiment, braking system 30 converts the kinetic energy of rotor hub assembly 12 into electrical energy, via a generator, or fluid pressure, via a hydraulic pump, which is then dissipated, stored and/or used to power other components of rotorcraft 10. In some embodiments, braking system 30 may utilize components that are already present on rotorcraft 10, such as an alternator or hydraulic pump, thereby reducing the need for additional componentry. For example, braking system 30 may utilize the hydraulic or electrical subsystems of rotorcraft 10 to dynamically or regeneratively reduce the rotational speed of rotor hub assembly 12. Braking system 30 may also be used to apply differing braking forces to rotor hub assembly 12 at different times, thereby reducing the potential for pilot error and allowing for modulated braking according to situational circumstances. Braking system 30 may also be used to prevent rotor hub assembly 12 from rotating at all, as may be necessary in some operational circumstances, such as during overnight storage.

Engine 24 selectively provides rotational input to rotor hub assembly 12 by utilizing a clutch mechanism. Engine 24 may engage and disengage from main rotor gear 22 and rotor hub assembly 12, via a clutch or one or more gears, as necessary for the particular operation. For example, when rotorcraft 10 is grounded, engine 24 may be disengaged from main rotor gear 22 such that rotational input from engine 24 is not transmitted to main rotor gear 22. Also, when engine 24 does not provide rotational input to main rotor gear 22, such as when engine 24 is disengaged from main rotor gear 22 or when engine 24 fails or slows, main rotor gear 22 and rotor hub assembly 12 are permitted to freely rotate. In one example, a freewheeling unit may be interposed between main rotor gear 22 and engine 24 to enable rotor hub assembly 12 to freely rotate regardless of the amount of rotational input engine 24 provides to main rotor gear 22, if any. In this example, braking system 30 may be driven from the rotor side of a freewheeling unit to absorb the kinetic energy of rotor hub assembly 12. When engine 24 ceases to provide rotational energy via drive shaft 26, the freewheeling unit allows rotor hub assembly 12 to freely rotate, thereby allowing braking system 30 to absorb the kinetic energy of rotor hub assembly 12. Also, while braking system 30 is shown to be located in gearbox 20, braking system 30 may be located anywhere on rotorcraft 10.

While braking system 30 is shown to be operable with respect to rotor hub assembly 12, braking unit 30 may be operable to slow or stop any rotor on rotorcraft 10, including tail rotor 32. Any number of braking systems 30 may be utilized on rotorcraft 10, including both electrical and hydraulic braking systems. Also, rotor hub assembly 12 and tail rotor 32 may each utilize one or more separate braking systems 30. It should be appreciated that rotorcraft 10 is merely illustrative of a variety of aircraft that can implement the embodiments disclosed herein. Indeed, braking system 30 may be utilized on any aircraft that has rotating blades or turbines. Other aircraft implementations can include hybrid aircraft, tiltrotor aircraft, unmanned aircraft, gyrocopters and a variety of helicopter configurations, to name a few examples. The illustrative embodiments may also be used on the propulsion systems of airplanes, such as propellers or turbines. It should be appreciated that even though aircraft are particularly well-suited to implement the embodiments of the present disclosure, non-aircraft vehicles and devices, such as turbines, can implement the embodiments.

Referring to FIGS. 2 and 3 of the drawings, an electrical braking system is schematically illustrated and generally designated 100. Electrical braking system 100 is operable to slow or stop mast 102, which is connected to the rotor hub assembly (not shown). In particular, electrical braking system 100 includes a generator 104 to which a braking force may be selectively applied by braking unit 106, thereby reducing the rotational speed of mast 102. Generator 104 includes an armature 108 that is mechanically coupled to mast 102, and therefore the rotor hub assembly, such that armature 108 is rotatable in response to rotation of the rotor hub assembly. Armature 108 includes conducting wire capable of carrying current. In the illustrated embodiments, armature 108 includes coiled conducting wire. It will be appreciated by one of ordinary skill in the art that armature 108 may take many forms or shapes.

Generator 104 also includes one or more magnets 110 at least partially surrounding armature 108. Magnets 110 are non-rotating relative to armature 108. Magnets 110 may be any type of magnet suitable for a generator, such as permanent magnets or electromagnets. In some embodiments, generator 108 may be an alternator that is used to produce electricity for the electrical components of the rotorcraft. Generator 104 may be either an alternating current (AC) generator or direct current (DC) generator, depending on the application. Armature 108 of generator 104 is mechanically coupled to mast 102, and therefore the rotor hub assembly, via gears 112, 114, 116, 118. Gear 118 is a main rotor gear, such as main rotor gear 22 in FIG. 1A. Armature 108 is also mechanically coupled to mast 102 via shafts 120, 122. Mast 102, which is a shaft, protrudes from main rotor gear 118 to support the rotor hub assembly. Shaft 122 connects gear 114 to gear 116 and shaft 120 connects gear 112 to armature 108. In the illustrated embodiment, generator 104 is mounted on shaft 120. Via interconnected gears 112, 114, 116, 118, shafts 120, 122 and mast 102, armature 108 rotates in response to rotation of the rotor hub assembly. Thus, the braking force provided by braking unit 106, which provides an electrical resistance to the rotation of armature 108, provides resistance to the rotation of shaft 120, which in turn resists the rotation of the rotor hub assembly via gears 112, 114, 116, 118, shafts 120, 122 and mast 102.

The exact connection of armature 108 to the rotor hub assembly via gears 112, 114, 116, 118, shafts 120, 122 and mast 102 is for purposes of illustration only. Generator 104 may be located on any rotating portion of the drive system of the rotorcraft that is mechanically coupled to the rotor hub assembly. Indeed, generator 104 may be mounted on mast 102 itself. Any number of gears, shafts or other parts may be mechanically coupled between generator 104 and the rotor hub assembly, while still allowing armature 108 to rotate in response to the rotation of the rotor hub assembly. In some embodiments, generator 104 may be on the rotor side of a freewheeling unit such that armature 108 rotates in response to rotation of the rotor hub assembly even in the absence of rotation input from an engine, such as engine 24 in FIG. 1A. In one example, shaft and gear 125 may be rotated, directly or indirectly, by the engine, which provides rotational energy to main rotor gear 118 via gears 114, 116. In this example, the engine may be engaged or disengaged from shaft and gear 125 by a clutch. A freewheeling unit may also be coupled to shaft and gear 125 so that insufficient input from the engine does not stall or prevent the free rotation of main rotor gear 118.

Braking unit 106 is in selective electrical communication with generator 104. Armature 108 includes a commutator 126, which is rigidly coupled to and rotates with armature 108. Braking unit 106 is electrically coupled across commutator 126. Braking unit 106 may be coupled to commutator 126 via electrical-conducting wires 128, 130. Wires 128, 130 may be electrically coupled to commutator 126 via electrical-conducting brushes. Braking unit 106, when engaged, contributes an electrical load to the illustrated circuit running through armature 108, which causes electrical resistance to the rotation of armature 108 amidst magnets 110, thereby reducing the rotation of the rotor hub assembly.

Braking unit 106 may be in selective electrical communication with armature 108 via a switch 132. Switch 132 may be closed in response to a braking signal input from a pilot of the rotorcraft or elsewhere, thereby closing the electrical circuit between generator 104 and braking unit 106 to cause armature 108 to reduce rotational speed. However, it will be appreciated that braking unit 106 may be electrically coupled to armature 108 in a variety of ways to cause the braking unit 106 to be selectively applied as an electrical load on the circuit. In applying braking unit 106, the kinetic energy of the rotor hub assembly is converted into electrical energy by generator 104. Braking unit 106 may dissipate or store the generated energy, or may use the generated electrical energy in other parts of the rotorcraft.

In the embodiments in which generator 104 is an alternator that is used for other purposes on the rotorcraft, electrical braking system 100 reduces the number of additional parts needed to stop or slow the rotor hub assembly, as existing componentry is utilized. Such re-use of existing componentry reduces rotorcraft weight, complexity and costs. In other embodiments, generator 104 may also be used as a motor that rotates the rotor hub assembly. In this embodiment, generator 104, when used as a motor, may be powered by an external electrical power source to rotate armature 108 and therefore the rotor hub assembly. For example, an engine, such as engine 24 in FIG. 1A, may be used to power the motor, and this motor may be used as generator 104 when braking unit 106 is applied thereto. When the motor changes its function to a generator, the flow of the current and torque may reverse to cause rotor hub assembly to reduce its rotational speed. Also, multiple electrical braking systems 100 may be utilized for the rotor hub assembly. Multiple electrical braking systems 100 may allow the braking resistance to be fine-tuned or sized appropriately to the particular rotorcraft.

Electrical braking system 100 may also allow an electrical braking input to be used by a pilot, computer or other device to reduce the rotation of the rotor hub assembly. For example, braking functions may be modulated electronically so as to prevent a pilot from over-applying the brakes, as can happen in a disc-and-caliper braking system. An active braking system may also allow the electrical resistance applied to armature 108 to be varied over time, or depending on the operational circumstances. Also, allowing for braking to be initiated via electronic braking input eliminates the need for a pilot of the rotorcraft to use a manual lever, as is used in a disc-and-caliper system. Such levers can be heavy and difficult to use, especially during critical flight operations.

Referring to FIGS. 4 and 5A, an electrical braking system is schematically illustrated and generally designated 200. In electrical braking system 200, the braking unit is one or more resistors 202. When the brakes are applied to the rotor hub assembly, the kinetic energy of the freely-rotating rotor hub assembly, supported by mast 206, is converted into electrical energy by generator 204, which resistor 202 then dissipates as heat into the atmosphere. The electric load provided by resistor 202 may be selectively engaged with generator 204 via switch 207, which may be controlled by a pilot of the rotorcraft or from elsewhere. Because the electrical energy is ultimately dissipated, electrical braking system 200 is a rheostatic braking system.

In some embodiments, resistor 202 may be one or more variable resistors. In such embodiments, the resistance provided by resistor 202 may be selected by the pilot or modulated by a computer system to adjust the braking force applied to the rotor hub assembly. The variable resistor may also modulate the pilot's input to prevent over-braking. For example, if a pilot incorrectly applies a maximum braking force via input controls in the cockpit, the variable resistor may apply a less-than-maximum resistance to generator 204 so that over-braking of the rotor hub assembly does not occur. In other embodiments, resistor 202 may be a bank of multiple resistors applied in series or parallel to generator 204. If applied in parallel, each of the resistors may have a different resistance value, and may be selected, individually or in combination, thereby allowing different electrical loads on generator 204. In some embodiments, one or more vents, cooling fans or radiators may be located adjacent resistor 202. The vents, cooling fans or radiators may help prevent the accumulation of heat at or near resistor 202.

Referring specifically to FIG. 4, a schematic circuit diagram of electrical braking system 200 is shown in which armature 208 is in electrical communication with resistor 202. Magnetic field 210 causes armature 208 to reduce rotational speed when an electric load, such as resistor 202, is applied to the circuit that runs through armature 208. The flow of current in the circuit is shown by arrows 212, 214, 216. In some embodiments, contactors 218, 220 are normally opened and contactors 222, 224 are normally closed during braking operations. Contactors 222, 224 may be opened or closed depending on whether resistor 202 is being applied as an electric load to generator 204.

Figure 5B:
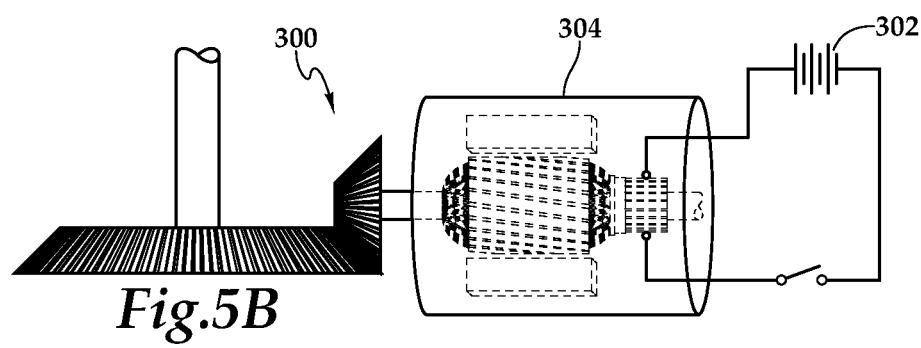

Referring to FIG. 5B, a regenerative electrical braking system is schematically illustrated and generally designated 300. Instead of a resistor that dissipates electrical energy into heat, electrical braking system 300 includes a rechargeable battery 302 in selective electrical communication with generator 304. Electrical energy produced by generator 304 is stored by rechargeable battery 302 for later use by electrical components of the rotorcraft. In some applications, electrical braking system 300 may be installed on a rotorcraft that already has a rechargeable battery for use in other rotorcraft functions, thereby using existing componentry to minimize the weight, volume and cost of electrical braking system 300. In other embodiments, rechargeable battery 302 may instead be a capacitor or any other electrical storage device adapted to capture electrical energy produced by generator 304 for future use. The use of rechargeable battery 302 enables electrical braking system 300 to convert the kinetic energy of a freely-rotating rotor hub assembly into a useful form of energy for use by the rotorcraft at any time. In a traditional disc-and-caliper braking system, the kinetic energy of the freely-rotating rotor hub assembly is wasted. Therefore, electrical braking system 300 allows the rotorcraft to conserve energy by harnessing the kinetic energy of the rotor hub assembly during braking operations that would otherwise have been wasted.

Figure 5C:
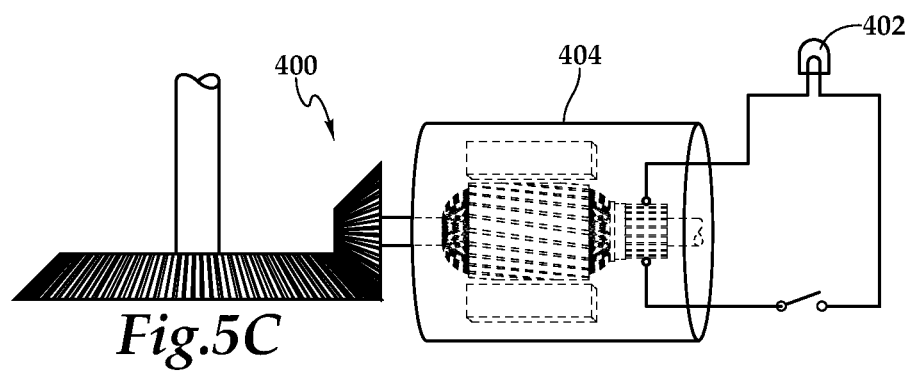

Referring to FIG. 5C, a regenerative electrical braking system is schematically illustrated and generally designated 400. The braking unit of electrical braking system 400 is a light source 402, such as a light bulb or LED. The electrical energy produced by generator 404 during braking operations is used to power and illuminate light source 402. In other embodiments, light source 402 may represent any electrical component, including an electrical component that does not impede rotorcraft shutdown or that dissipates energy. In other examples, the electrical energy produced by generator 404 may be returned to a supply line or power grid for the rotorcraft, such as a central power distribution system that powers the electrical components of the rotorcraft. By powering the electrical components of the rotorcraft with the kinetic energy of the freely-rotating rotor hub assembly, energy use from other power sources of the rotorcraft may be lessened or conserved.

Figure 6:
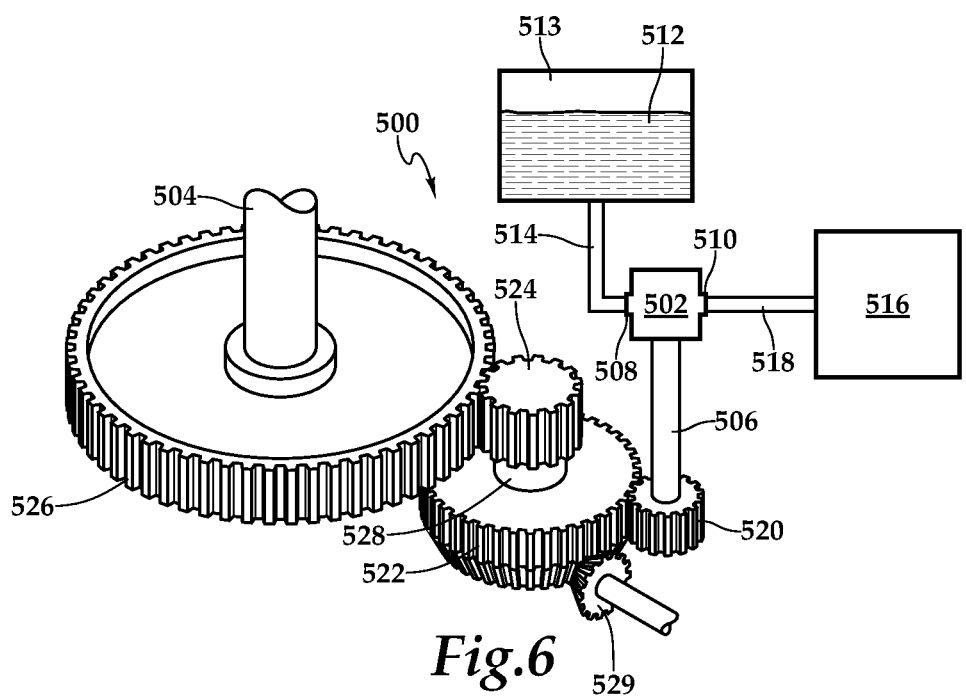
FIG. 6 is an isometric view of a hydraulic braking system for use on a rotorcraft in accordance with embodiments of the present disclosure.

Referring to FIG. 6, a hydraulic brake system is schematically illustrated and generally designated 500. Hydraulic brake system 500 includes a hydraulic pump 502 that is mechanically coupled to mast 504, which in turn supports the rotor hub assembly. Hydraulic pump 502 includes an input shaft 506 that rotates in response to rotation of the rotor hub assembly. Hydraulic pump 502 also includes an input port 508 and an output port 510. In the illustrated embodiment, rotation of input shaft 506 causes hydraulic pump 502 to draw a fluid 512 from reservoir 513 through a conduit 514 and input port 508, then to pump fluid 512 out through output port 510 to braking unit 516 via conduit 518. Braking unit 516, which is in fluid communication with hydraulic pump 502, is adapted to selectively provide a braking force, in the form of hydraulic resistance or load, to hydraulic pump 502, thereby reducing a rotational speed of input shaft 506 and the rotor hub assembly. Hydraulic pump 502 is operable to convert the kinetic energy of the rotor hub assembly into fluid energy, pressure and flow rate, which may then be dissipated, stored or used as necessary by braking unit 516.

In the illustrated embodiment, hydraulic pump 502 is mechanically coupled to the rotor hub assembly by gears 520, 522, 524, main rotor gear 526, as well as input shaft 506, shaft 528 and mast 504. Gears 520, 522, 524, main rotor gear 526, input shaft 506, shaft 528 and mast 504 are mechanically coupled between the rotor hub assembly and hydraulic pump 502 such that gears 520, 522, 524, main rotor gear 526, input shaft 506, shaft 528 and mast 504 rotate in response to rotation of the rotor hub assembly. Thus, when hydraulic resistance is applied to hydraulic pump 502 by braking unit 516, the rotational speed of gears 520, 522, 524, main rotor gear 526, input shaft 506, shaft 528, mast 504 and rotor hub assembly is reduced.

While hydraulic pump 502 is shown to be mechanically coupled to the rotor hub assembly by gears 520, 522, 524, main rotor gear 526, input shaft 506, shaft 528, mast 504, hydraulic pump 502 may be mechanically coupled to the rotor hub assembly by any number of gears, shafts, or other parts. Hydraulic pump 502 may be mechanically coupled to any rotating portion of the drive system of the rotorcraft that is mechanically coupled to the rotor hub assembly. Also, hydraulic brake system 500 may be on the rotor side of a freewheeling unit such that the rotor hub assembly is permitted to freely rotate input shaft 506 in the absence of sufficient input from an engine, such as engine 24 in FIG. 1A. In one example, shaft and gear 529 may be rotated, directly or indirectly, by the engine, which provides rotational energy to main rotor gear 526 via gears 522, 524. In this example, the engine may be engaged or disengaged from shaft and gear 529 by a clutch. A freewheeling unit may also be coupled to shaft and gear 529 so that insufficient input from the engine does not stall or prevent the free rotation of main rotor gear 526.

Hydraulic pump 502 may be any type of pump capable of moving fluid. For example, hydraulic pump 502 may be a gear pump, rotary vane pump, screw pump, bent axis pump, radial piston pump, peristaltic pump or flow pump, to name a few. Hydraulic brake system 500 may also include one or more check valves (not shown) to keep fluid 512 flowing in a desired direction. For example, conduit 514 may include a check valve so that fluid 512 is permitted to flow from reservoir 513 to hydraulic pump 502, but not in the opposite direction.

In some embodiments, hydraulic pump 502 may provide fluid energy to other hydraulically-powered components of the rotorcraft. In these embodiments, hydraulic pump 502 is a pre-existing element of the rotorcraft, eliminating the need to install additional componentry and reducing the weight, cost and complexity of the rotorcraft. In addition, multiple hydraulic pumps, such as hydraulic pump 502, may be mechanically coupled to the rotor hub assembly, and each hydraulic pump may support respective hydraulic brake systems, such as hydraulic brake system 500. By using multiple hydraulic brake systems 500, the braking resistance provided to the rotor hub assembly may be fine-tuned based on the particular operational needs of the particular rotorcraft.

Braking unit 516 is operable to apply a braking force to hydraulic pump 502 in response to a braking signal input from the pilot of the rotorcraft or from elsewhere. In some embodiments, fluid 512 may be diverted away from braking unit 516 until the braking unit 516 is fluidly engaged with hydraulic pump 502 during braking. Such a fluid diversion may be accomplished by a hydraulic switch. In other examples, gear 520 may engage with gear 522 in response to the braking signal input, thereby causing braking unit 516 to resist rotation of input shaft 506 and slowing or preventing the rotation of the rotor hub assembly. Braking unit 516 may dissipate, store or use fluid energy, in the form of pressure or flow rate.

Figure 7A:
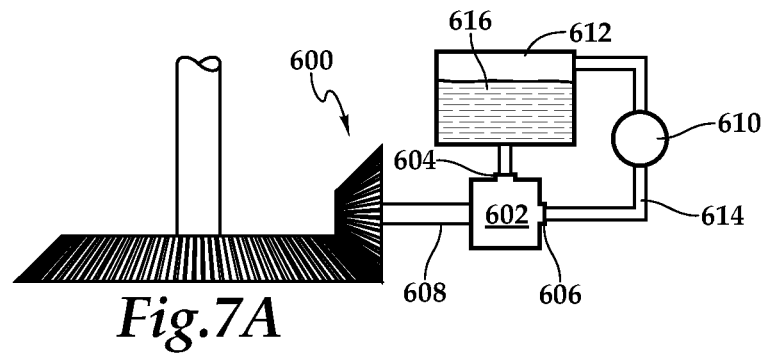
FIGS. 7A-7C are various schematic side views of hydraulic braking systems having different braking units for use on a rotorcraft in accordance with embodiments of the present disclosure.

Referring to FIG. 7A, a hydraulic braking system is schematically illustrated and generally designated 600. Hydraulic braking system 600 includes hydraulic pump 602 that has input port 604 and output port 606. Hydraulic resistance to the rotation of input shaft 608 is provided by an adjustable orifice 610, which is in fluid communication with output port 606. The fluid energy produced by hydraulic pump 602, which is in response to the rotation of the rotor hub assembly, is dissipated by adjustable orifice 610 by bleeding fluid pressure to reservoir 612 at selectively high flow rate. By adjusting the size of adjustable orifice 610, fluid flow may be restricted and a selectable amount of fluid pressure may be allowed to build in conduit 614, thus providing hydraulic resistance to hydraulic pump 602. For example, during a braking operation, adjustable orifice 610 may be reduced to a small size to build the pressure of fluid 616 in conduit 614 to a level that resists rotation of input shaft 608, and therefore the rotor hub assembly, by forcing hydraulic pump 602 to do more work. When the braking operation has ceased, adjustable orifice 610 may be enlarged so that fluid 616 may more freely flow into reservoir 612, which is in fluid communication with adjustable orifice 610. Adjustable orifice 610 dissipates the fluid energy transmitted by hydraulic pump 602 in such a way that hydraulic braking system 600 may be considered to be a dynamic braking system.

By adjusting the size of adjustable orifice 610, the amount of resistance provided by hydraulic pump 602 to the rotation of the rotor hub assembly may be modulated. For example, in the event that a pilot over-applies the brakes, adjustable orifice 610 may be contracted only slightly so that an over-application of resistance to the rotation of the rotor hub assembly does not occur. By actively braking the rotorcraft in this manner, overall safety may be enhanced. In another embodiment, the size of adjustable orifice 610 may be automatically controlled via a computer or manually via switches so that the correct amount of braking force may be applied to the rotor hub assembly in accordance with the particular maneuver or braking operation taking place. Adjustable orifice 610 may be any aperture capable of transmitting fluid and that adjusts in response to input. In one non-limiting example, adjustable orifice 610 includes a solenoid valve. The solenoid valve may be adjusted, via electronic input, to adjust the size of the adjustable orifice 610.

Figure 7B:
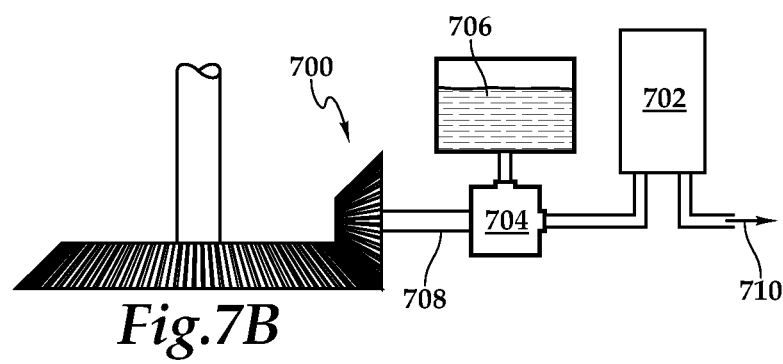

Referring to FIG. 7B, a hydraulic braking system is schematically illustrated and generally designated 700. The braking unit of hydraulic braking system 700 is a hydraulic accumulator 702 that is adapted to store a pressurized fluid. When engaged, hydraulic pump 704 pumps fluid 706 into hydraulic accumulator 702. Hydraulic accumulator 702 provides a hydraulic resistance, in the form of fluid pressure, to the rotation of input shaft 708, thereby providing resistance to the rotation of the rotor hub assembly. In some embodiments, hydraulic accumulator 702 may be kept in close proximity to hydraulic pump 704 and be adapted to achieve higher pressures not normally experienced by other components of the hydraulic subsystem of the rotorcraft. Hydraulic accumulator 702 and hydraulic pump 704 may be adapted to manage higher than normal pressures, while the rest of the hydraulic subsystem experiences normal hydraulic system pressures via a pressure regulator (not shown).

Fluid pressure may be stored in hydraulic accumulator 702 for later use. For example, the fluid pressure in hydraulic accumulator 702 may be used to power one or more hydraulically-powered components of the rotorcraft at a later time. Such downstream components are signified in FIG. 7B by arrow 710. A non-limiting example of a component that may be powered by the fluid pressure from hydraulic accumulator 702 is a hydraulic starter. The various hydraulically-powered components that may be powered by the hydraulic accumulator 702 are numerous.

Figure 7C:
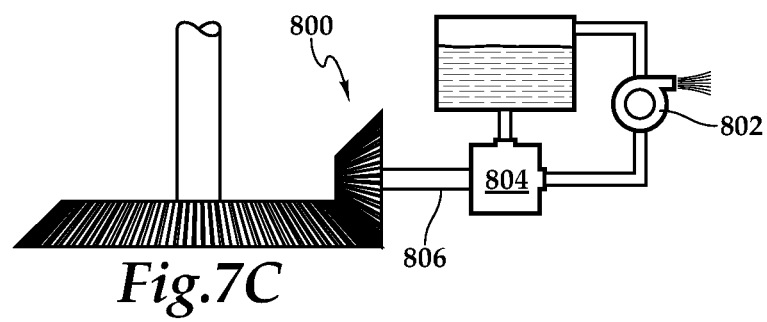

Referring to FIG. 7C, a hydraulic braking system is schematically illustrated and generally designated 800. The braking unit of hydraulic braking system 800 is a hydraulic blower 802. Hydraulic blower is a hydraulically-powered component that may utilize the fluid energy emanating from hydraulic pump 804 to perform a function (e.g., blowing air), while simultaneously providing hydraulic resistance to the rotation of input shaft 806, thereby resisting the rotation of the rotor hub assembly. While FIG. 7C shows a hydraulic blower as the hydraulically-powered component that provides hydraulic resistance to hydraulic pump 804, any hydraulically-powered component may be used in hydraulic braking system 800, including those that do not adversely affect shutdown or braking of the rotorcraft.

The illustrative embodiments described above, including the hydraulic and electrical braking systems, may, in some implementations, not require the hardware of conventional rotorcraft brake systems, such as disc-and-caliper braking systems. The illustrative embodiments may also be automatically controlled via computer, or manually via switches. In some embodiments, automated braking may be possible in both the electrical and hydraulic braking systems. In such automated braking systems, a pilot may engage the braking function while the braking unit dissipates rotor energy at a controlled rate while the pilot continues with an operational checklist. The illustrative embodiments may also provide protection for components of the rotorcraft by preventing the pilot from inadvertently over-applying the brakes.

In the example in which the illustrative embodiments use existing componentry of the rotorcraft, such as existing generators, alternators or hydraulic pumps, the illustrative embodiments may be designed to fail in such a way that flight critical functions are not lost. Thus, failure of the electrical or hydraulic braking systems would not equate to failure of either the electrical or hydraulic subsystems of the rotorcraft, respectively. In some embodiments, both a hydraulic braking system and an electrical braking system may be used on a single rotorcraft. Either or both of the hydraulic or electrical braking systems may also be "blended" with traditional braking methods, such as disc-and-caliper friction-based braking. In such blended braking scenarios, the hydraulic or electrical braking system may, in some embodiments, be used to reduce the rotor hub assembly speed to a predetermined level, after which traditional braking methods take over to bring the rotor hub assembly to a complete stop. Other forms of engagement and interaction between hydraulic, electrical and traditional braking systems may be utilized depending on the application.

The illustrative embodiments, including both the hydraulic and electrical braking systems, provide a number of advantages, depending on the embodiments utilized. For example, the illustrative embodiments may reduce the number of parts on the rotorcraft. By reducing the number of parts, labor may be saved by reducing part procurement and the number of qualification/acceptance tests necessary for utilization of those parts. A lower number of parts may also be kept in inventory, and room may be made on the rotorcraft for other components.

The illustrative embodiments may also reduce the weight of the rotorcraft by eliminating an entire subsystem (e.g., disc-and-caliper brakes). Such elimination of an entire subsystem may be made possible by the utilization of existing components on the rotorcraft, such as the alternator and/or a hydraulic pump. The cost of the rotorcraft may also be reduced by reducing the installation time and number of components on the rotorcraft. Maintenance and inspection of the eliminated parts is no longer necessary, further reducing cost. Smart, or active, braking may also be achieved using the illustrative embodiments, thereby allowing automated/computer-controlled braking to reduce pilot workload. At least a portion of these advantages, as well as others, may be realized by the illustrative embodiments.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A braking system for a rotorcraft having a rotor hub assembly driven by an engine, the system comprising:
    a hydraulic rotary pump having an input shaft mechanically coupled to the rotor hub assembly such that the input shaft is rotatable in response to rotation of the rotor hub assembly, the hydraulic rotary pump selectably drivable by the engine; and
    a braking unit in fluid communication with the hydraulic rotary pump, the braking unit adapted to selectively provide a hydraulic resistance to rotation of the input shaft, thereby reducing a rotational speed of the rotor hub assembly.

2. The braking system as recited in claim 1 wherein the braking unit further comprises an orifice operable to adjust the hydraulic resistance applied to the input shaft of the hydraulic rotary pump, the orifice adjustably contractable into an infinite number of positions.

3. The braking system as recited in claim 2 further comprising a fluid reservoir in fluid communication with the orifice.

4. The braking system as recited in claim 2 wherein the orifice further comprises a solenoid valve.

5. The braking system as recited in claim 1 wherein the braking unit further comprises a hydraulic-powered component.

6. The braking system as recited in claim 1 wherein the braking unit further comprises a hydraulic accumulator adapted to store a pressurized fluid usable to power a hydraulic-powered component of the rotorcraft.

7. The braking system as recited in claim 1 wherein the hydraulic rotary pump is selected from the group consisting of a gear pump, a rotary vane pump, a screw pump, a bent axis pump, a radial piston pump, a peristaltic pump, a rotary positive displacement pump and a flow pump.

8. The braking system as recited in claim 1 wherein the rotorcraft is operable in a storage mode, the braking unit engaged in the storage mode to prevent rotation of the rotor hub assembly.

9. The braking system as recited in claim 1 wherein the rotorcraft is operable in a grounded mode, the engine disengaged from the rotor hub assembly in the grounded mode.

10. The braking system as recited in claim 1 wherein the hydraulic rotary pump is in constant engagement with the rotor hub assembly via one or more gears during all operations of the rotorcraft.

11. The braking system as recited in claim 1 wherein the braking unit further comprises a hydraulic accumulator adapted to store a pressurized fluid usable to power a hydraulic starter of the rotorcraft.

12. The braking system as recited in claim 1 wherein the braking unit further comprises a hydraulic blower.

13. The braking system as recited in claim 1 further comprising a disc-and-caliper braking subsystem.

14. The braking system as recited in claim 13 wherein, in response to a braking input, the braking unit slows the rotor hub assembly to a predetermined level prior to the disc-and-caliper braking subsystem slowing the rotor hub assembly from the predetermined level to zero revolutions per minute.

15. The braking system as recited in claim 1 wherein the engine further comprises a motor.

16. A rotorcraft, comprising:
 a fuselage;
 an engine disposed in the fuselage;
 a rotor hub assembly protruding from the fuselage, the rotor hub assembly driven by the engine to rotate relative to the fuselage;
 a hydraulic rotary pump having an input shaft mechanically coupled to the rotor hub assembly such that the input shaft is rotatable in response to rotation of the rotor hub assembly, the hydraulic rotary pump selectably drivable by the engine; and
 a braking unit in fluid communication with the hydraulic rotary pump, the braking unit adapted to selectively provide a hydraulic resistance to rotation of the input shaft, thereby reducing a rotational speed of the rotor hub assembly.

17. The rotorcraft as recited in claim 16 further comprising a gearbox containing a plurality of gears, the hydraulic rotary pump mechanically coupled to the rotor hub assembly via at least one of the plurality of gears.

18. The rotorcraft as recited in claim 16 wherein the engine is operable to selectively provide rotational input to the rotor hub assembly; and
 wherein the rotor hub assembly is operable to freely rotate in response to mechanical disengagement between the engine and the rotor hub assembly.

19. The rotorcraft as recited in claim 16 wherein the braking unit applies the hydraulic resistance in response to a braking signal input from a pilot of the rotorcraft.

\* \* \* \* \*